Jan. 5, 1943. R. H. CRAMER 2,307,572
GAUGING AND SORTING MACHINE
Filed May 29, 1940 7 Sheets-Sheet 4

INVENTOR
RAYMOND H. CRAMER
BY
Romeyn A. Spare
HIS ATTORNEY

Jan. 5, 1943.  R. H. CRAMER  2,307,572
GAUGING AND SORTING MACHINE
Filed May 29, 1940  7 Sheets-Sheet 7

FIG_15_

FIG_16_

INVENTOR_
RAYMOND H. CRAMER
BY
Romeyn A. Spare
HIS ATTORNEY

Patented Jan. 5, 1943

2,307,572

UNITED STATES PATENT OFFICE 2,307,572

GAUGING AND SORTING MACHINE

Raymond H. Cramer, Newark, N. J., assignor to General Motors Corporation, Detroit, Mich., a corporation of Delaware Application May 29, 1940, Serial No. 337,887

12 Claims. (Cl. 209—88)

This invention relates to gauging and sorting machines and particularly to such a machine for use with tapered rollers.

It is common practice to automatically grind tapered rollers, as used for bearings, under mass production methods with the result that many of these rollers are not finished to the same precisely required size. These size variations, although slight, are of sufficient magnitude to necessitate that the rollers be carefully and individually measured and thereafter sorted so that only rollers of identical size are used in the same bearing.

Heretofore, accurate and rapid mass production measuring and sorting of these tapered rollers in accordance with their minor size variations has presented a serious problem. It is, therefore, an object of this invention to provide a simply constructed and efficient machine which will automatically and successively gauge tapered rollers with great rapidity and thereafter automatically sort these gauged rollers into groups of predetermined sizes in accordance with minute variations in the roller sizes. Another object is to provide a gauge which visually indicates the work size and which selectively controls a sorting mechanism for grouping the work pieces into predetermined sizes.

To these ends, and also to improve generally upon devices of the character indicated, my invention consists in the various matters hereinafter described and claimed.

This invention includes a gauging device generally indicated at A and a co-operating work-sorting device generally indicated at B and operated under control of the gauging device. Work pieces, such as the tapered rollers W stacked in a feed tube 20, are individually and successively fed into a work nest 22 on a work-nest carrier 23 which is oscillated by a rotatably driven cam 24 from a loading position (Figure 6) through a gauging position (Figure 1) to an ejecting position (Figure 7) and then back to the loading position for another repeating cycle. A gauge generally indicated at G, which visually indicates the variation in work size as well as the one of a series of bins, as H, to which the work piece being gauged is to be delivered, selectively operates one of a series of electrical switches S that selectively opens one of a corresponding series of trap doors 25 in the sorting device B. When the work piece or roller W is ejected from the nest 22 (Figure 7), it is directed by a work guide or hopper 26, carried by a rotating table 28, over a series of work receiving pockets 30, one of which is selectively opened by the previously operated trap door 25 so that this gauged work piece W is directed through the desired pocket 30 and a co-operating chute 31 into the bin H that contains other pieces of the same size. Before the next work piece W is brought by the nest 22 to a gauging position, the previously opened trap door 25 is automatically closed and the parts are returned to their initial positions for another gauging and sorting cycle.

Figures 6, 8, 9:
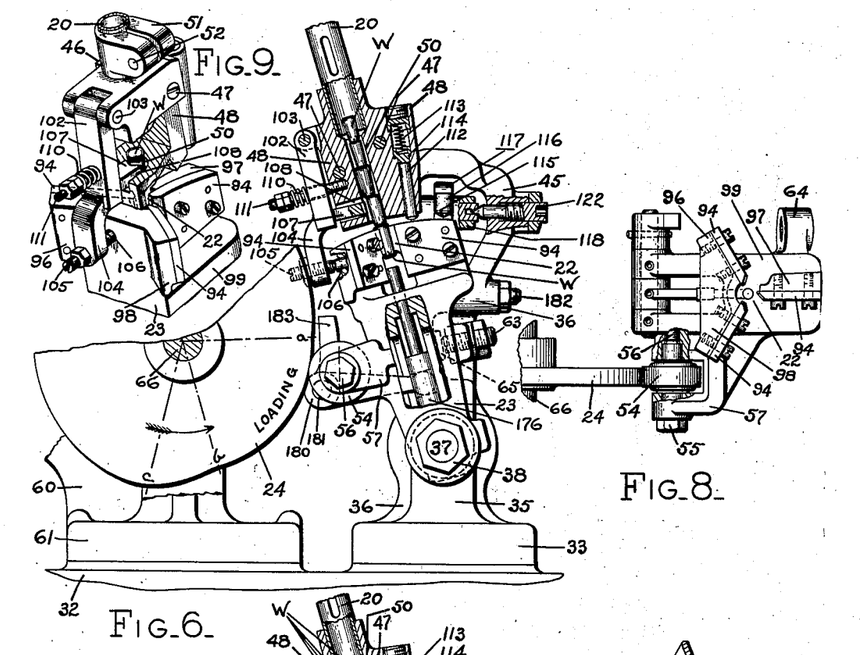
Figure 6 is an enlarged fragmentary sectional view taken along the line 6—6 of Figure 2 and showing the work nest and associated parts in loading position.
Figure 8 is an enlarged fragmentary plan view of the work nest.
Figure 9 is an enlarged fragmentary perspective view of the work gripping mechanism in the work loading device.
Figure 7:
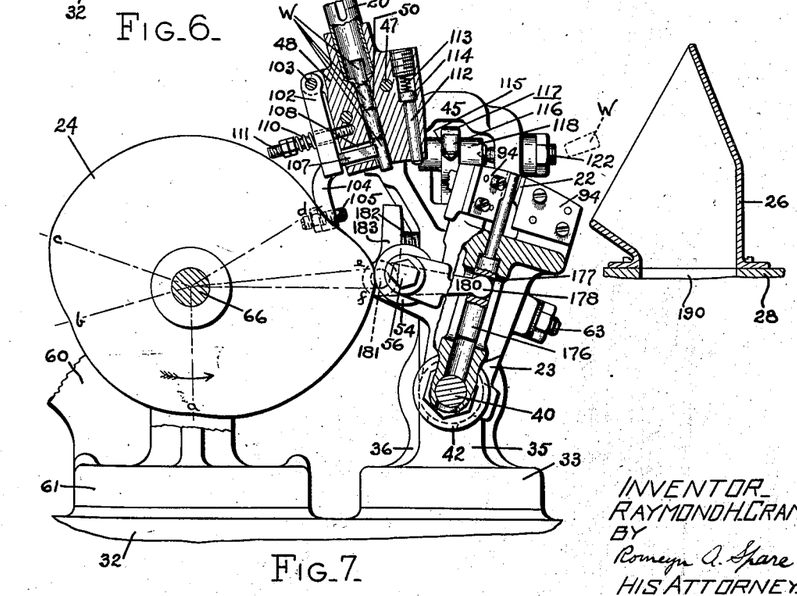
Figure 7 is an enlarged fragmentary view generally similar to that of Figure 6 but showing the work nest in ejecting position.

Referring now particularly to the drawings, the gauging device A has a base 32 upon which is secured a pivot bracket 33 having a pair of spaced upstanding arms 35 and 36 that respectively receive the opposed pivot screws 37 which are locked in adjusted position by the nuts 38 and which support the carrier 23 at its lower end for freely swinging pivotal movement between the work loading position of Figure 6 and the work ejecting position of Figure 7. To facilitate lateral adjustment of the work nest 22 as well as adjustment of the carrier supporting bearings, the inner ends of the pivot screws 37 are preferably conical and fit within conical seats in the ends of a shaft 40 that extends through and is adjustably secured, as by the screws 41, to a hub 42 at the lower end of the carrier 23. The arm 36 extends upwardly beyond the carrier 23 and has a yoke 45 provided with a flange 46 to which is secured, as by the screws 47, a work loading block 48 that is provided with a work receiving bore 50 axially aligned with the nest 22 when the nest is in the work loading position of Figure 6. The upper end of the bore 50 connects with a counterbore that receives the feed tube 20, and the upper portion of the loading block has a clamp 51 engaged by a screw 52 for securing the tube 20 in position. The upper end of the tube 20 is preferably funnel shaped to facilitate loading of the work, and slots may be provided in the sides of the tube so that the operator may easily count the number of work pieces loaded therein. The tube 20 is of such a length as to co-operatively form with the bore 50 a magazine of suitable capacity for holding work pieces to be successively gauged and sorted.

The swinging movement of the carrier 23 between the work loading and work ejecting positions of Figures 6 and 7 is controlled by the cam 24 that engages a roller 54, such as an antifriction bearing, mounted on a stud 55 removably secured, as by a threaded portion 56, in a bifurcated arm 57 laterally extending from the carrier 23 and towards the cam 24, while a coiled spring 58 (Fig. 1), tensioned between the upper end of the carrier 23 and an adjustment stud 59 in an arm 60 of a bracket 61, mounted on the base 32, and secured by a nut 62, serves to maintain the roller 54 against the cam 24. The return swinging movement of the carrier 23 to the loading position of Figure 6 is limited by an adjustable stop screw 63 secured in adjustment by a lock nut and threaded in an overhanging ear 64 on the carrier 23 and engageable against an abutment 65 on the arm 36.

A cam shaft 66, on which the cam 24 is fastened, is supported by bearings such as the antifriction bearings 67 mounted in the brackets 61, 68 and 69 secured to the base 32. A motor 71, in the base 32, has a stepped driving pulley 72 connected by a belt 73 to a stepped driven pulley 74 that is carried by suitable bearings 75 on a stub shaft 76 mounted in a bracket 77 that is fastened to the base 32. A gear 78, secured to the driven pulley 74, transmits rotation to a gear 79, fastened on the cam shaft 66, through an intermediate idler gear 80 which is carried by a shaft 81 in the arm 60. To facilitate belt tensioning adjustment and shifting of the belt 73 to different pulley steps for regulating the operating speed of the cam shaft 66, the motor 71 is secured to a support 82 pivotally mounted at one side by a shaft 83 in a bracket 84 secured to the base 32, while the other side of the support 82 is pivotally connected to the lower end of the link 85 which is pivoted at its upper end to an adjustment member 86 having a screw threaded portion 87 extending upwardly through a hole in the base and adjustably engaged by a nut 88 engaging the base as shown in Fig. 13.

As best illustrated in Figures 6 to 9, the work nest 22 includes three generally similar blades 94 having inwardly directed work supporting end portions which are provided with tapering end faces so located that a roller W in the nest 22 is matingly and firmly supported by the blades 94 along three of the elements of the peripheral surface of the roller, these elements being preferably disposed 120° apart. This roller W, which has its larger end projecting above the nest, is located axially perpendicular to the axis of swinging movement of the carrier 23. The blades 94 are respectively and removably secured and precisely positioned on the angularly disposed arms 96, 97 and 98 that project upwardly from a head 99 at the upper end of the carrier 23, and the upper faces of the blades 94 and the arms 96, 97 and 98 are longitudinally arcuate to permit close swinging movement of the carrier 23 beneath the work loading block 48. The blades 94 may be replaced with other blades of different end spacing and having the required angular disposition of their end faces to support other sizes of work pieces.

Figures 10, 11, 11A, 12, 13, 14:
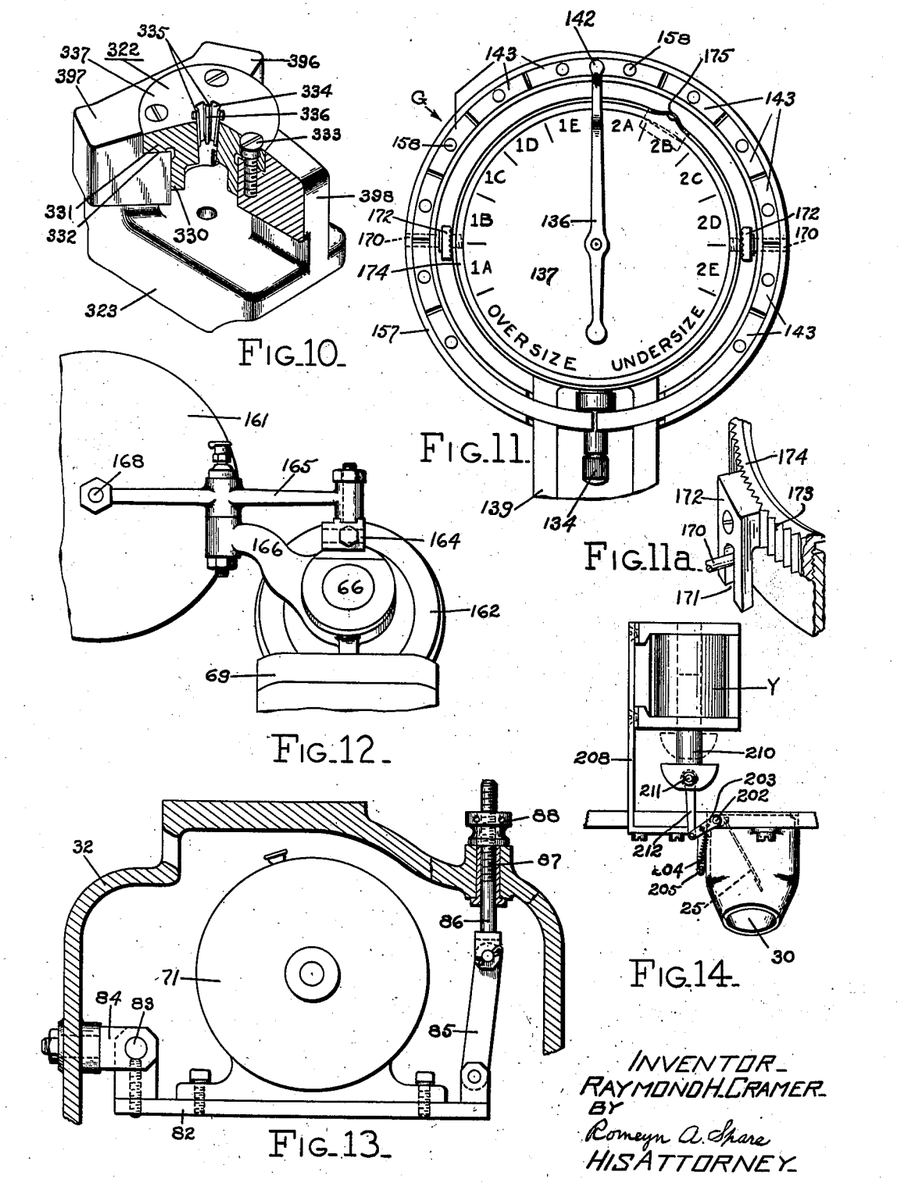
Figure 10 is a perspective view of another work nest that may be employed in this invention.
Figure 11 is an enlarged fragmentary front elevation of the gauge indicator.
Figure 11a is a fragmentary perspective view of the switch segment guide.
Figure 12 is an enlarged fragmentary end view showing the mechanism for shifting the selector switch into and out of operative position.
Figure 13 is a fragmentary sectional view showing the motor mounting.
Figure 14 is a fragmentary end view of one of the door controls in the sorting device.
Figure 15:
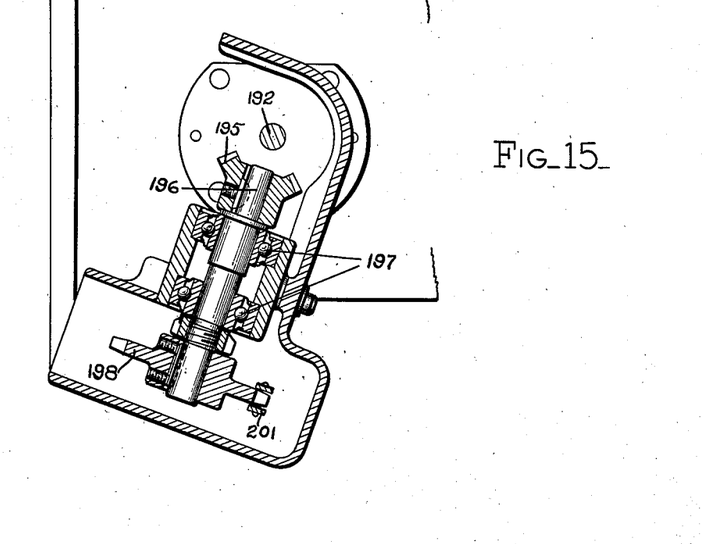
Figure 15 is a fragmentary sectional view of the drive for the sorting device.

Figure 10 shows a modified form of carrier and work nest. A carrier 323 generally similar to the carrier 23 is provided with the upwardly extending angularly disposed arms 396, 397 and 398 that correspond to the arms 96, 97 and 98, and which removably support an alternative form of work nest 322. This work nest 322 comprises a single piece sleeve-like member having a lower annular skirt 330 fitted against the arms 396, 397 and 398, and the upper annular flange 331 is matingly seated in the arcuate stepped recesses 332 of the arms and rigidly and removably fastened in position by the screws 333. The nest 322 has a tapering central bore 334 provided with a plurality of inwardly extending peripherally spaced flutes, as 335, having the tapering inner faces 336 that will matingly engage and support a tapered roller W along a plurality of the elements of the peripheral surface of the roller. The top face 337 of the nest 322 is substantially dome-shaped so that it will not interfere with the swinging movement of the carrier beneath the block 48, and the bore 334 is aligned with an ejector member in the same manner as will be later described with reference to the nest 22. The nest 322 is removably secured in position so that it may be replaced by similar nests of other sizes to provide for the gauging of different sized rollers.

Each time that the empty work nest 22 returns to the loading position of Figure 6, the bottom roller W in the loading block 48 is released by a brake member 102 and dropped into the nest 22. The brake member 102, which is pivotally connected at its upper end to the loading block by a pin 103, has a depending arm 104 provided with an adjustment screw 105 that is held in adjusted position by a lock nut and which is engaged by an abutment 106 on the carrier 23 when the carrier swings into loading position. A brake arm 107 laterally projects from the member 102 into a slot 108 that opens into the lower end of bore 50 adjacent to the bottom roller W.

The inner end of the brake arm is preferably V-shaped and normally grips against the bottom roller W under influence of a coiled spring 110 on a stud 111 freely projecting through a hole in the brake member 102 and threadably received in the loading block 48, the compression of the spring 110 being suitably adjusted by nuts on the end of stud 111. The screw 105 is so regulated that the carrier 23 shifts the brake arm 107 to a released position only when the empty nest 22 lies directly beneath the roller W as shown in Figure 6. The cam 24 has a dwell portion from $a$ to $b$ so that the carrier 23 will hesitate in its swinging movement sufficiently long to receive the bottom roller W in the nest 22. As soon as the carrier leaves the work loading position, the brake member 102 is released so that the arm 107 engages the next roller W which now is the bottom roller in the loading block.

Figure 1:
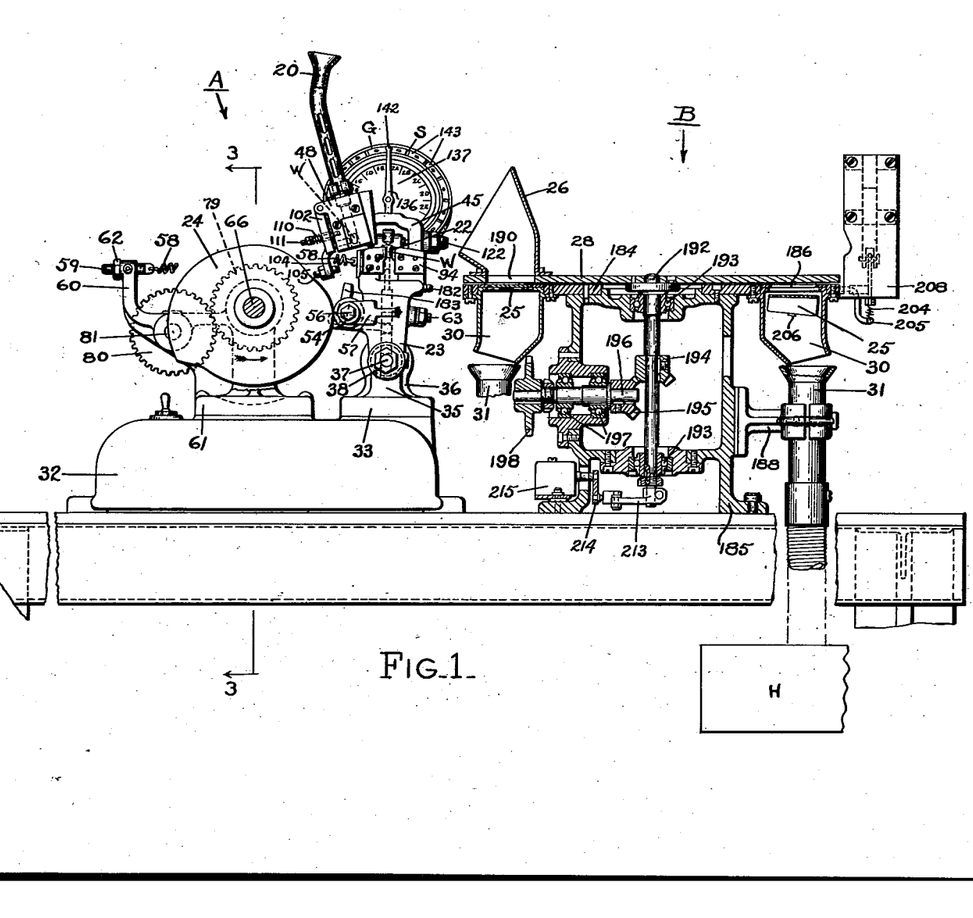
Figure 1 is a fragmentary front elevation of the invention with the gauging and sorting mechanisms shown in the same general plane and with the sorting mechanism principally in diametrical section.
Figure 2:
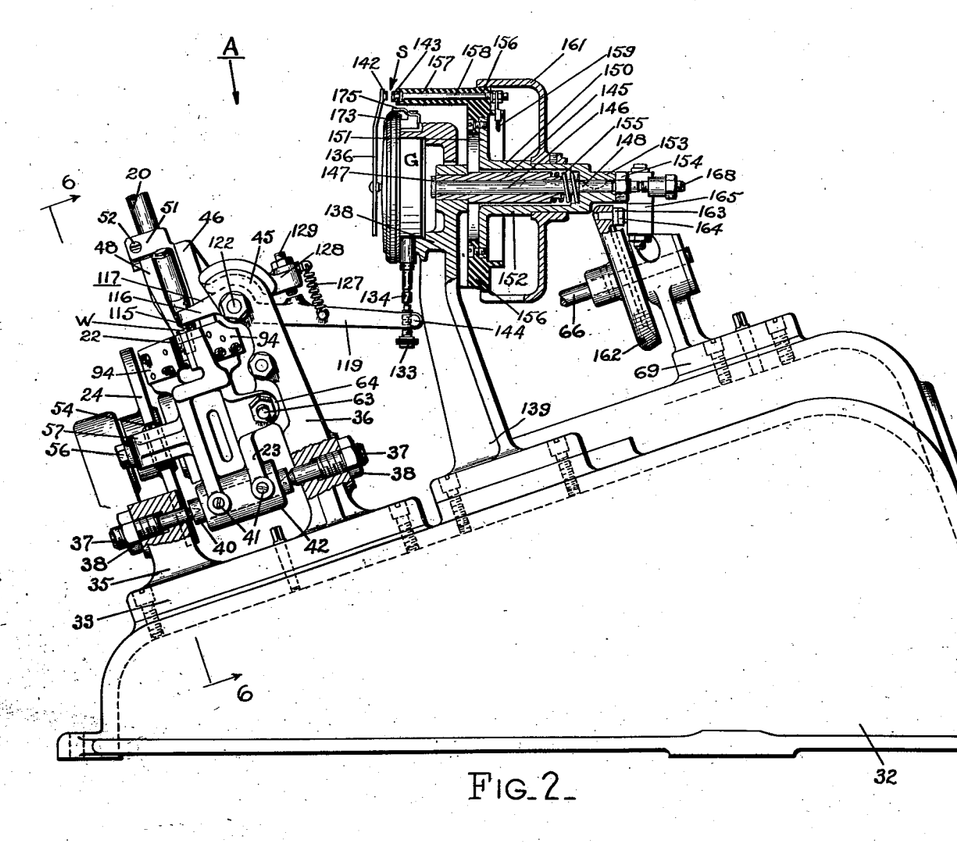
Figure 2 is a fragmentary side elevation of the gauging mechanism.

As the cam 24 continues to turn in the direction indicated by the arrow, the rising cam-portion $b$—$c$ engages the roller 54 and quickly swings the carrier 23 from the work loading position of Figure 6 to the gauging position of Figure 1 where there is a dwell of the carrier movement while the ensuing uniform cam portion $c$—$d$ engages the roller 54. During this swing of the carrier into the gauging position, the top of the roller W, which projects above the work nest 22, cams beneath the lower rounded end of a plunger 112 slidably mounted in the work loading block 48. This plunger 112 is yieldably urged downwardly by a coiled spring 113 to assure that the roller W is firmly seated against the end faces of each of the blades 94. A head 114 on the upper end of the plunger 112 limits the downward plunger movement and prevents engagement of the lower end of the plunger 112 with the empty work nest when the nest later returns to work loading position.

As the carrier 23 swings into the gauging position of Figure 1, the projecting upper end of the roller W cams under and lifts a substantially conical wear-resistant contact point 115, such as a diamond, secured to the underside of the forwardly extending end of the short arm 116 of an amplifying lever 117 provided with a supporting hub 118 and a long rearwardly extending arm 119. This hub 118 is pivotally journalled on the opposed conical ends of the pivot screws 122 threaded in the arms of the yoke 45 and secured in adjusted position by lock nuts, these screws 122 being so adjusted as to provide free tilting of the lever 117 without lost motion of the lever on the pivot screws. A coiled spring 127, tensioned between an ear 128 on the yoke 45 and the lever arm 119, tilts the forward end of the lever 117 downwardly to normally locate the contact point 115 in position to be engaged by the upper end of the roller W in the gauging position of Figure 1, and an adjustment screw 129 in the ear 128 and secured in adjusted position by a lock nut, limits this downward movement so that the contact point 115 may only lie in the path of movement of the upper end of a roller W in the nest 22.

The tapered rollers W in the feed tube 20, which vary in size due to difficulties in manufacture, are individually fed from the loading block 48 and successively seated in the nest 22. Rollers of slightly different sizes project through correspondingly different extents above the nest, and each roller in gauging position serves to tilt the amplifying lever 117 correspondingly to the size of this roller. An adjustment screw 133 on the inner end of the lever 117 supports the axially movable stem 134 of the dial gauge G that has a pointer 136 movable over a graduated scale 137. This gauge G is rigidly supported in a housing 138 in the upper end of a bracket 139 secured to the base 32. The graduations of the scale 137 are marked "oversize" at one end of the pointer travel and "undersize" at the other end of the pointer travel, and the scale therebetween is provided with the uniformly spaced indicia 1A, 1B, 1C, 1D, etc., each of which indicia corresponds to a suitable predetermined increment change in the size of the roller W being measured, such as one ten thousandth of an inch. If desired, the scale may also be graduated in suitable units so that pointer may directly indicate the work size.

The sorting device B is provided with a series of chutes 31 that correspond in number to the scale indicia and respectively communicate with bins, one of which is shown at H. The position at which the pointer 136 stops during a gauging operation indicates the bin to which the roller W being gauged will be automatically delivered by the sorting device B. This is accomplished by the closing of an electrical circuit through the contact point 142 on the end of the pointer 136 with one of a series of switch segments 143 after the pointer reaches its measuring position; the closing of this circuit serving through a relay as $r$, and a solenoid, as Y, to selectively open the required trap door 25. To assure co-ordination of the work size with the correct scale graduations when the gauging mechanism is initially regulated, a roller W of known size is placed in the nest 22 which is then shifted to gauging position and the screw 133 is adjusted to locate the pointer 136 at the correct scale reading. This screw 133 is locked in adjusted position by a set screw 144.

A rearwardly extending bushing 145, rigidly secured at its forward end in the housing 138, slidably supports a stud 146 that has a head 147 at its forward end and which has a rearward extension 148 beyond the bushing 145. A hub 150, provided at its forward end with an annular flange 151 has a sleeve portion 152 spaced about the bushing 145, and the reduced rearward end 153 of this hub is rigidly secured to the reduced end of the extension 148 as by a key and by a nut 154 threaded on the extension. A coiled spring 155, compressed between the rearward end of the bushing 145 and the reduced end 153, normally serves to hold the hub 150 in a rearward position away from the gauge G with the head 147 against the bushing 145.

A generally dish-shaped contact unit 156, composed of a suitable insulating material and secured to the flange 151 for axial movement with the hub 150, has an arcuate side wall 157 substantially surrounding and overhanging the gauge G. The sector-shaped spaced switch segments 143, which are insulated from each other, are secured to the outer forward rim of the contact unit 156 by terminal bolts 158 that extend through the side wall 157. The rearward ends of these bolts are provided with terminals to which are respectively secured lead wires, one of which is shown at 159. As best shown in Figure 11, the adjacent switch segments 143 are separated by narrow elongated spaces that are respectively in radial alignment with the division lines between the indicia on the scale 137. The switch segments 143 correspondingly positioned to the designations of "oversize" and "undersize," are closely spaced at the bottom of the scale and are of much greater arcuate length than the switch segments respectively corresponding to the uniform graduations 1A, 1B, etc., 2A, 2B, etc. A substantially dish-shaped guard 161 is secured to the sleeve portion 152 and overlies the rearward end of the contact unit 156 to protect the terminals and lead wires connected thereto.

During a short period of the gauging operation and during the dwell of the carrier movement while the pointer 136 is at rest in a measuring position, the contact unit 156 is shifted forwardly to close the circuit between one of the switch segments 143 and the contact point 142 on the pointer 136, and the contact unit 156 is thereafter quickly withdrawn from circuit closing position before the pointer 136 again swings back to a non-gauging position. To accomplish this, a cam 162 mounted on the cam shaft 66, is provided with a striker shoe 163 that engages a striker block 164 on the rearward end of a lever 165 fulcrumed on the arm 166 of the supporting bracket 69 secured to the base 32. The forward end of the lever 165 threadably receives an adjustment screw 168 secured in position by a lock nut, and the screw 168 is so adjusted that when the striker shoe 163 engages the striker block 164, the screw 168 forces the stud 146 towards the gauge G causing the hub 150 and the contact unit 156 to shift forwardly closing the contacts 142 and 143 which are immediately thereafter opened when the spring 155 returns the parts to their initial positions upon disengagement of the shoe 163 with the block 164.

The switch segments 143 are maintained in desired radial alignment with the corresponding scale readings on the dial 137 by the pins 170 mounted in the wall 157 and which project inwardly towards the gauge G. These pins 170 respectively and slidably engage within the slots 171 of the brackets 172 rigidly secured to and having toothed portions interfitting with peripherally disposed serrations 173 on a bezel 174 which is threaded on the gauge casing. A spring finger 175, fastened to the gauge casing, removably interfits with the closely spaced bezel serrations 173 to facilitate adjustably turning the bezel for minute adjustment of the position of the switch segments 143 relative to the scale readings on the dial 137 which is secured to the gauge casing.

At the completion of the gauging operation, the rising contour d—e of the continuously rotating cam 24 engages the roller 54 and quickly swings the carrier 23 to the position of Figure 7 wherein the gauged roller W is ejected from the work nest 22 into the hopper 26 of the sorting mechanism B. A plunger 176, slidably journalled in the carrier 23 beneath and in substantially axial alignment with the roller W supported in the work nest, has a transverse slot 177 that receives the enlarged rounded head 178 on the inner end of a bell crank 180 journalled on a pin 181 mounted in a laterally projecting arm of the carrier 23. A stud 182, threaded in the arm 36 and held in adjusted position by a lock nut, adjustably projects into the path of movement of the upstanding arm 183 of the bell crank 180. When the carrier 23 nearly reaches the work ejection position of Figure 7, the arm 183 strikes against the stud 182 and the bell crank 180 rapidly lifts the plunger 176 into striking engagement with the lower end of the roller W in the work-nest causing this roller to be quickly ejected from the nest and to fall into the hopper 26 as indicated in Figure 7. The uniform cam portion e—f on the cam 24 provides for a short dwell in the carrier movement while the parts are in the position of Figure 7 to provide opportunity for ejection of the roller W from the nest before the following cam portion f—a returns the empty work nest again to the loading position of Figure 6. During this return movement of the carrier 23, the plunger 176 and the bell crank 180 under the influence of gravity again return to their initial inoperative positions as shown in Figure 6.

Figure 3:
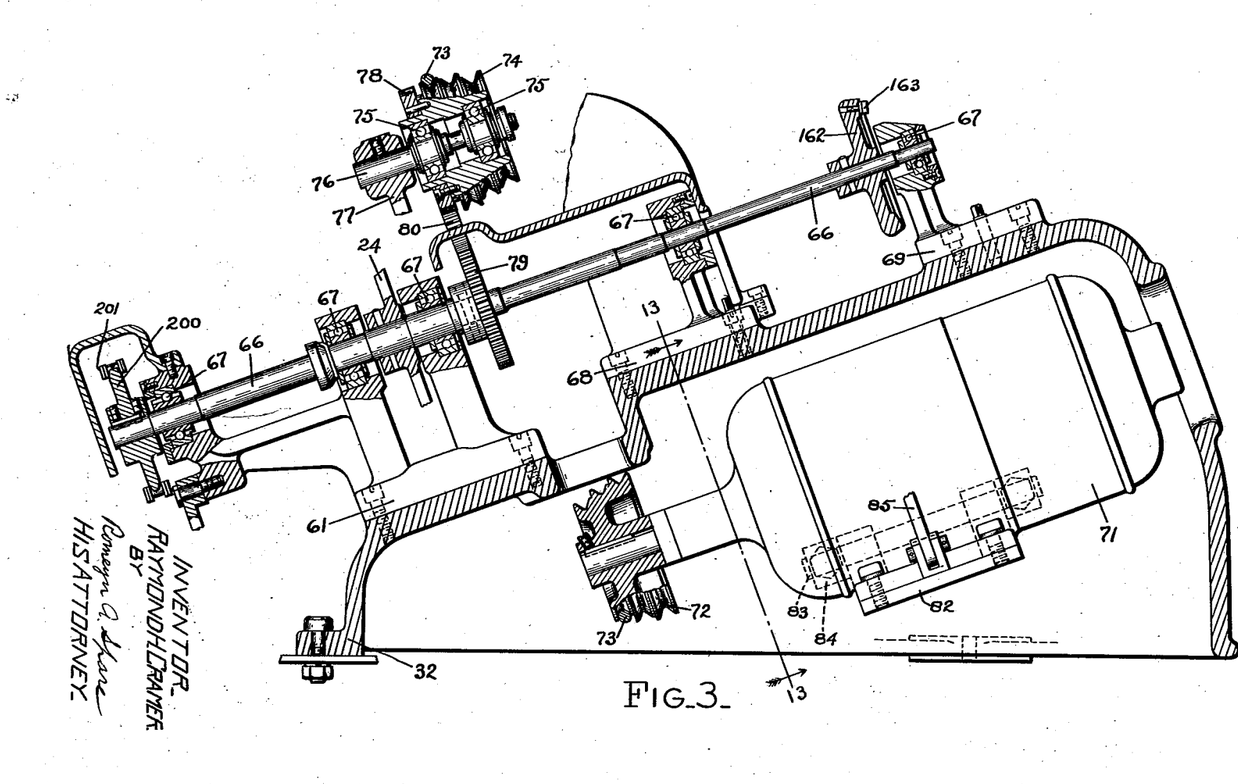
Figure 3 is a sectional view through the gauging device and taken substantially along the lines 3—3 of Figure 1.
Figure 4:
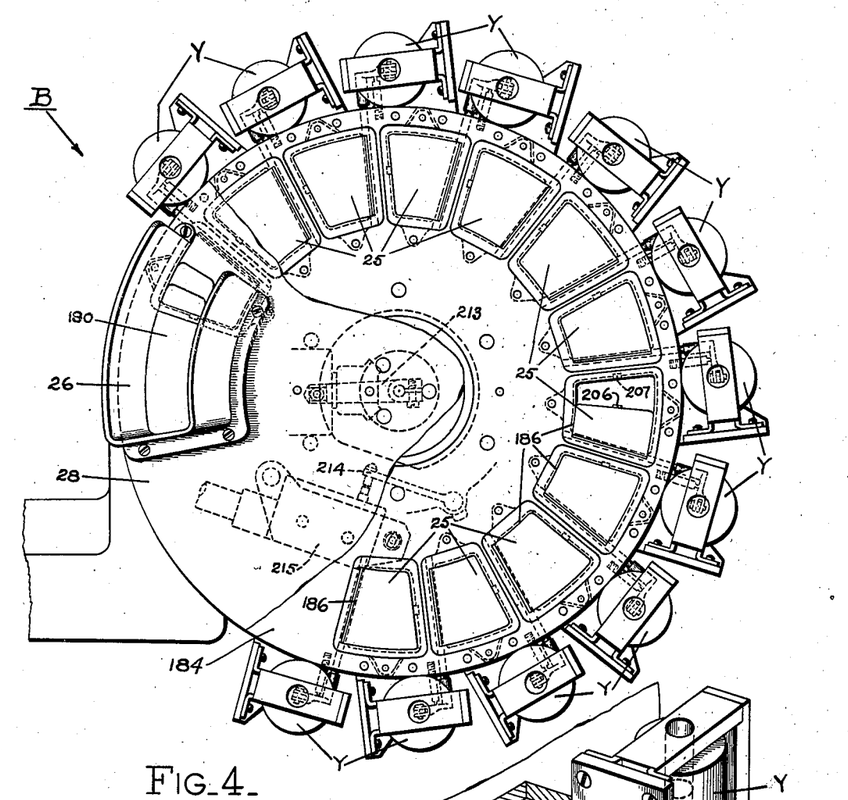
Figure 4 is a plan view of the sorting mechanism.

The sorting device B includes a generally circular platform 184 rigidly supported on a base 185 and provided with a series of arcuately disposed spaced ports 186 each of which respectively corresponds to one of the indicia on the dial 137. Each of these ports is respectively closed by a door 25 under selective control of the measuring position reached by the pointer 136 during the measuring operation, as will be later described. Each port 186 receives the open upper end of a tubular work receiving pocket 30 secured to the underside of the platform 184, and the lower open end of each pocket 30 respectively communicates with the upper end of a co-operating chute 31 which is supported by a bracket 188 secured to the base 185. The table 28 is apertured at 190 at the base of the hopper 26. A measured roller W entering the hopper 26 is guided through this aperture onto the platform 184, and the rotation of the table 28 sweeps this roller over the successive ports closed by the doors 25 until this roller encounters a port previously and selectively opened by one of the doors 25 whereupon the roller falls through the pocket 30 and the co-operating chute 31 into the bin H intended for like rollers of the same size. The rotatable table 28 is secured to the upper end of a vertical drive shaft 192 rotatably supported by the suitable bearings 193 in the base 185. A bevelled gear 194 fastened on the shaft 192 is enmeshed with a bevelled gear 195 on a countershaft 196 rotatably supported by the bearings 197 in the base, and a sprocket 198 on the shaft 196 is drive connected to a sprocket 200 (Fig. 3) on the cam shaft 66 by a chain 201. These sprockets and gears have their ratios so chosen that the hopper 26, carried by the continuously rotated table 28, reaches a work receiving position (Figure 4) adjacent the nest 22 each time that the nest 22 reaches the work ejecting position of Figure 7.

Figure 5:
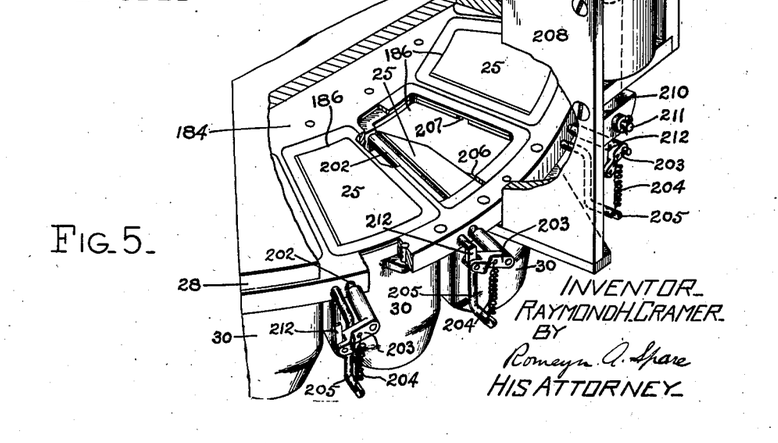
Figure 5 is an enlarged fragmentary perspective view showing the release mechanism for the doors in the sorting device.

As illustrated in Figures 5 and 14, each trap door 25, which closes the upper end of the pocket 30 is fastened at one side for swinging movement into the pocket by a supporting shaft 202 journalled in the platform 184. A lever arm 203 secured to the outer end of each shaft 202 is yieldably urged downwardly by a tensioned coiled spring 204 fastened at its lower end to a bracket 205 on the platform, and this spring tension is sufficient to normally secure the door 25 closed with its top face substantially in the plane of the top face of the platform 184. A lip 206 on each door 25 fits into a corresponding recess 207 to limit the closed position of the door. A solenoid Y, supported on a bracket 208 mounted on the pltaform 184, is respectively operatively associated with each door 25. Each solenoid Y has a vertically slidable armature 210 pivotally connected at its lower end by a pin 211 to a link 212 pivotally connected at its lower end to the arm 203. When the solenoid Y is energized in response to the selected closing of one of the switch segments 143 with the pointer contact 142 during the measuring of a roller W, the selected armature 210 is lifted and the required door 25 is swung downwardly to an opened position so that this roller W will be delivered into the bin H which contains similar rollers of the same size. Upon deenergization of this solenoid Y, the weight of the armature 210 co-operates with the pull of the spring 204 to again swing the door 25 upwardly to a closed position.

As the rotating table 28 carries the hopper 26 and the work receiving aperture 190 past the last port 186, a swinging arm 213 on the lower end of the shaft 192 cams against an arm 214 and momentarily opens a switch 215 in the circuit of all of the solenoids Y so that the previously opened trap door 25 will be automatically closed prior to the next roller measuring operation. The arm 213 is preferably so positioned that the switch 215 is opened and then closed prior to the cam controlled closing of the gauge contacts 142 and 143 during the following gauging operation of the next roller in the nest 22.

Figure 16:
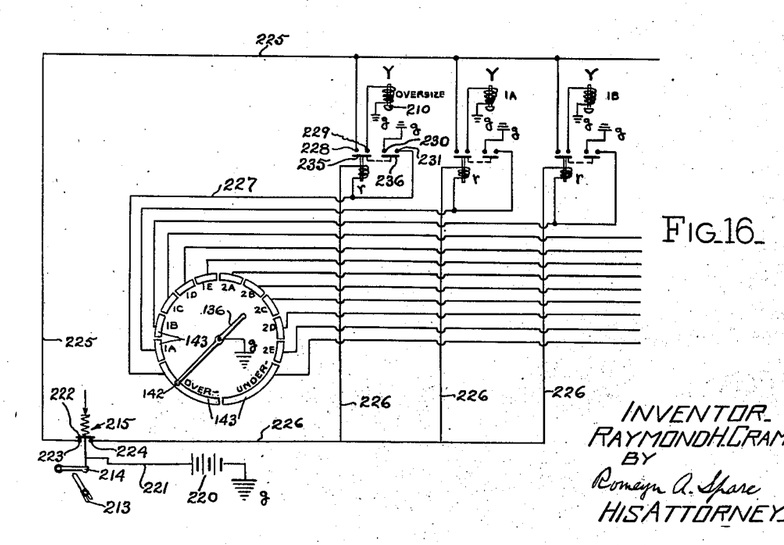
Figure 16 is a diagram of the wiring of the electrical control circuit.

Referring now to the electrical circuits as diagrammatically shown in Figure 16, to avoid duplication only one of these circuits will be described in detail, since each of these identical circuits includes a trap door operating solenoid Y controlled through a relay r that is selectively operated by the size indicating position of the pointer 136 during the measuring of a roller W. A suitable source of energy, as a battery 220, is connected between a ground g and a lead 221 that is electrically connected to the movable contact 222 of the switch 215 which is normally spring urged into a circuit closing position across the terminals 223 and 224 respectively connected to the lead wires 225 and 226. One end of the coil of each relay r is connected to the common lead wire 226 and the other ends of these relay coils are respectively connected to the successive switch segments 143 that correspond to the successive indicia on the dial 137. For example, the lower end of the first relay coil is connected through a wire 227 to the switch segment corresponding to the dial indicia of "oversize." This first relay r has two pairs of switch points 228 and 229, and 230 and 231. The switch point 228 together with the similarly located switch points of the succeeding relays is connected to the common lead wire 225. The switch point 229 is connected to one end of the first solenoid Y which operates the armature 210 to open the first trap door 25 that directs the "oversize" rollers W into the correct bin H, and the other end of this first solenoid coil is grounded at g. The switch point 230 is grounded, and the switch point 231 is connected to the wire 227. The relay r includes a pair of simultaneously operated nonelectrically connected switch arms 235 and 236 which are normally in open circuit positions and which respectively electrically connect the switch points 228 and 229, and 230 and 231 only when the relay r is energized.

Assuming that an oversize roller is being gauged in the work nest 22, the pointer 136 will so indicate on the dial 137 and the cam 162 will shift the contact unit 156 forwardly into a circuit closing position of short duration. At this time, current will flow from the battery 220 through the lead 221 and the contact 222 into the lead 226, through the first relay r back through the wire 227 and the pointer contact 142 to the other side of the battery through the ground, thereby energizing this relay and shifting the switch arms 235 and 236 into circuit closing positions. Current will also flow from the battery 220 and contact 222 through the line 225 from the switch point 228 through the arm 235 to the switch point 229 and thence through the solenoid Y and back through the ground to the battery to open the desired trap door 25. The cam 162 breaks the circuit between the pointer contact 142 and its selected switch segment 143 before the duration of the gauging operation, and the energized solenoid Y will continue to remain energized since the switch arm 236 is connected in parallel across the now opened circuit between the pointer 136 and the switch segment 143 connected to the wire 227. Current will now flow from the battery 220 and the contact 224 through this relay r, wire 227, switch point 231, arm 236, switch point 230, and back through the ground to the battery thus completing the circuit, so that this relay r will continue to hold the arm 235 in circuit closing position. After the hopper 26 and pocket 190 have passed over the last trap door 25 of the series, and before the next gauging operation wherein the same or another trap door 25 will be selectively opened in accordance with the roller size, the swinging arm 213 momentarily opens the contact 222 so that the battery is disconnected from all of the solenoids and relay circuits, and the previously opened trap door 25 will automatically swing upwardly to closed position under influence of the spring 204 and the weight of the armature 210.

I claim:

1. In a gauging and sorting machine for rollers, means to oscillate said work nest between a loading position and a discharging position and through a predetermined intermediate gauging position, said means holding the work nest stationary in said intermediate gauging position during a portion of the work nest oscillation in one direction, an oscillatable work nest for supporting a roller, a gauge for measuring the roller in said nest when said work nest is located at said predetermined position, a work engaging member forming part of said gauge and movable relative to said work nest, a sorting device, means to discharge the measured roller from the nest into the sorting device, and means controlled by the gauge for selectively operating the sorting device in such a manner that the measured roller will be selectively delivered by the sorting device to one of a plurality of predetermined work receiving stations in accordance with the measured size of said roller.

2. In a device for gauging and sorting frusto-conical rollers, a work nest for axially receiving and matingly supporting a frusto-conical roller along a plurality of the elements of the peripheral surface of said roller, means independent of said roller to swing said work nest back and forth between a loading and a discharge position and through an intermediate predetermined gauging position, a gauge including a member on said gauge movable relative to said nest and responsive to the position of one end of the roller in said nest for measuring the size of said roller, and a sorting device selectively controlled by said gauge for selectively directing the measured roller to one of a plurality of work receving stations as determined by the roller size measured by said gauge.

3. In a device for gauging and sorting tapered rollers, a work nest for matingly receiving a tapered roller along a plurality of the elements of its peripheral surface, means to oscillate the nest from a loading position through a predetermined gauging position to a discharging position, a gauge engageable with one end of the roller for measuring said roller when the nest is in said predetermined gauging position, a sorting device, an ejector mechanism for ejecting the roller into the sorting device each time that the nest reaches said discharging position, and control mechanism selectively operated by the gauge for selectively operating the sorting device to deliver the measured roller to one of a plurality of predetermined stations in accordance with the roller size as measured by said guage.

4. In a device of the character indicated, a work nest for matingly receiving a tapered roller along a plurality of the elements of its peripheral surface, means to oscillate the nest between a loading and a discharging position and through a predetermined intermediate gauging position, a gauge engageable with one end of said roller for measuring the roller size in said predetermined gauging position, a sorting device selectively controlled by said gauge to sort successively gauged rollers in accordance with the measured roller size, and means responsive to the nest movement for ejecting the measured roller from the nest into the sorting device each time that the nest reaches said discharging position.

5. In a device of the character indicated, a work nest for matingly receiving a tapered roller along a plurality of the elements of the peripheral surface of said roller, means to oscillate the nest between a loading and a discharging position and through an intermediate predetermined gauging position, means to deliver a single roller into the nest each time that the nest reaches a loading position, a gauge engageable with an end of said roller projecting from said nest for measuring the roller size in said predetermined gauging position, a sorting device selectively controlled by said gauge to sort successively gauged rollers as determined by the measured roller size, and means responsive to the nest movement for ejecting a measured roller from said nest and into the sorting device each time that the nest reaches said discharging position.

6. In a device for gauging and sorting tapered rollers, a work nest for successively receiving and axially seating the rollers with the large end of each roller uppermost, means to oscillate said nest back and forth over a predetermined path from a loading position through a predetermined gauging position to a discharging position, a gauge responsive to the location of the roller in the nest at said gauging position for measuring the roller size, a sorting device, mechanism controlled by said nest movement for automatically ejecting the measured roller from said nest into the sorting device each time that the nest reaches the discharging position, and means connected to the sorting device and responsive to said gauge for selectively controlling said sorting device to selectively deliver the measured roller from the sorting device to one of a plurality of work receiving stations in accordance with the measured roller size.

7. In a device of the character indicated, a pivotally supported work nest for matingly receiving a tapered roller along a plurality of the elements of its peripheral surface, cam operated means to swing the work nest between loading and ejection positions and through an intermediate predetermined gauging position, means to individually feed one of a plurality of tapered rollers into the nest each time that the nest reaches a loading position, a gauge engageable with en end of the roller in said nest for registering the roller size when the nest reaches said predetermined gauging position, a sorting device, means to eject the measured roller from the nest and into the sorting device each time that the nest reaches the ejection position, and means in the sorting device controlled by the gauge for selectively operating the sorting device to deliver the roller to one of a plurality of predetermined stations in accordance with the measured roller size.

8. In a gauging and sorting device for rollers, a work holder for matingly receiving a tapered roller along a plurality of the elements of the peripheral surface of said roller, means to shift said holder between a loading and an ejecting position and through a predetermined gauging position, a gauge for measuring the roller in said predetermined gauging position, a sorting device having a plurality of work receiving pockets for different sized rollers, ejection means for discharging the roller from the nest into the sorting device each time that the nest reaches said ejection position, selector mechanism controlled by the gauge during said roller measurement for pre-setting the sorting device to selectively deliver the measured roller into a predetermined work receiving pocket in accordance with the measured roller size, and means to return the sorting device to a non-selective position prior to the measurement of the next roller by said gauge.

9. In a device of the character indicated, a carrier pivoted about a horizontal axis, a work nest on the carrier and arranged to matingly support a tapered roller with the larger end of the roller projecting above the nest, cam actuated means for swinging the carrier back and forth to oscillate the work nest from a predetermined loading to a predetermined work ejecting position and through an intermediate predetermined work gauging position, carrier operated means for locating a roller in the nest each time that the nest reaches a loading position, spring pressed means for urging the roller into seated position in the nest before the nest reaches the gauging position, a gauge responsive to the extent of roller projection above the nest, and carrier operated means independent of said gauge for discharging each roller from the nest each time that the nest reaches the same predetermined work ejection position.

10. In a device of the character indicated, a carrier pivotally supported on a substantially horizontal axis, a work nest on said carrier and arranged to matingly support a tapered roller along a plurality of the elements of the peripheral surface of said roller, cam operated means for swinging the carrier back and forth to oscillate the work nest between a loading and an ejection position, a magazine for supporting a plurality of tapered rollers in end to end relation above the work loading position, a brake for normally holding the bottom roller in said magazine, carrier engaged means for releasing the brake and locating the bottom roller in the nest when said nest is in the loading position, and carrier operated means for removing each roller from the nest each time that said nest reaches the same predetermined ejection position.

11. In a device for gauging and sorting rollers, a work nest for removably supporting a roller firmly seated therein, means to periodically oscillate said nest between a loading and a discharge position and through a gauging position, a gauge for measuring the roller in said gauging position, a platform having a series of arcuately spaced roller receiving pockets, a rotatable work guide sequentially and periodically movable over the entrances to said pockets in timed relation to the work nest oscillation, said guide being located between the first and last pockets of the series when the work nest is in its discharging position, doors in the platform respectively opening and closing the entrance to each pocket, means normally urging said doors closed, door opening means selectively operated by the gauge as determined by the measured roller size, ejector mechanism for ejecting the measured roller from the nest into the work guide when the nest reaches said discharging position, and means operated in timed relation with the work guide rotation for closing said opened door after the guide has moved across the last pocket of said series and prior to the time that the next roller is carried by the nest into a gauging position.

12. In a gauging and sorting machine for rollers, a work nest for matingly receiving and perripherally supporting a roller, means to oscillate said work nest back and forth between a loading position and an ejecting position and through an intermediate predetermined gauging position, mechanism providing for a dwell of the work nest in said gauging position, a movable member operatively engageable with a roller in said gauging position, said member being moved by said roller and relative to said work nest in response to the position of said roller in said work nest, a gauge operated by said member, and a sorting device controlled by said gauge for selectively delivering the measured roller to one of a plurality of predetermined work receiving stations in accordance with the measured size of said roller.

RAYMOND H. CRAMER.

CERTIFICATE OF CORRECTION.

Patent No. 2,307,572.　　　　　　　　　　　　　　　January 5, 1943.

RAYMOND H. CRAMER.

It is hereby certified that error appears in the printed specification of the above numbered patent requiring correction as follows: Page 4, second column, line 68, for "pltaform" read --platform--; page 5, second column, lines 41 and 42, claim 1, strike out "an oscillatable work nest for supporting a roller," and insert the same before "means" in line 35, same claim; page 6, second column, line 2, claim 7, for "en" read --an--; and that the said Letters Patent should be read with this correction therein that the same may conform to the record of the case in the Patent Office.

Signed and sealed this 23rd day of February, A. D. 1943.

Henry Van Arsdale,
　　　　　　　　　　　　　　　　　Acting Commissioner of Patents.

(Seal)